US006996663B1

(12) United States Patent (10) Patent No.: US 6,996,663 B1
Marsteiner (45) Date of Patent: Feb. 7, 2006

(54) METHOD AND APPARATUS FOR PERFORMING ADDRESS TRANSLATION USING A CAM

(75) Inventor: Timothy D. Marsteiner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 763 days.

(21) Appl. No.: 09/951,038

(22) Filed: Sep. 12, 2001

(51) Int. Cl.
 *G06F 12/00* (2006.01)
(52) U.S. Cl. ........................ 711/108; 711/202; 370/355
(58) Field of Classification Search ................ 711/108, 711/202; 345/568; 710/316; 716/14; 370/355, 370/395.31, 395.32
See application file for complete search history.

(56) References Cited

U.S. PATENT DOCUMENTS

| | | | | |
|---|---|---|---|---|
| 5,388,099 A | * | 2/1995 | Poole | 370/380 |
| 5,390,173 A | * | 2/1995 | Spinney et al. | 370/393 |
| 5,414,704 A | * | 5/1995 | Spinney | 370/389 |
| 5,600,820 A | * | 2/1997 | Johnston | 711/171 |
| 5,680,566 A | * | 10/1997 | Peng et al. | 711/206 |
| 5,740,171 A | | 4/1998 | Mazzola et al. | |
| 5,872,783 A | | 2/1999 | Chin | |
| 6,236,658 B1 | | 5/2001 | Essbaum et al. | |
| 6,415,354 B1 | * | 7/2002 | Joffe et al. | 711/108 |
| 6,697,911 B2 | * | 2/2004 | Srinivasan et al. | 711/108 |
| 6,732,206 B1 | * | 5/2004 | Jensen et al. | 710/105 |
| 6,807,581 B1 | * | 10/2004 | Starr et al. | 709/250 |

OTHER PUBLICATIONS

"Cisco MGX 8850 Series Multiservice Switch," Cisco Systems, Inc., 1999-2002.
"Traffic Stream Processor, CX27470," Mindspeed Technologies, 2003.
"MVAC Routing CoProcessor (RCP) Family," Rev. 4a Mar. 6, 2001, MUSIC Semiconductors.

* cited by examiner

*Primary Examiner*—Pierre M. Vital
(74) *Attorney, Agent, or Firm*—Cesari and McKenna, LLP

(57) ABSTRACT

A technique for performing address translation that requires less logic and programming than conventional address translation techniques is described. The technique uses a CAM to perform address translation. The CAM is configured such that it contains key values that are representative of the address values to be translated. Associated with these key values are data values that representative of the translated address value. The address to be translated is applied to the CAM and if a matching key value is found, the data associated with the key value is output by the CAM.

12 Claims, 5 Drawing Sheets

METHOD AND APPARATUS FOR PERFORMING ADDRESS TRANSLATION USING A CAM

BACKGROUND OF THE INVENTION

1. Field of the Invention

The present invention relates to intermediate network nodes and, in particular, to a technique for efficiently performing address translation in an intermediate network node.

2. Background Information

A class of data networking equipment, referred to as Internet Protocol (IP)+Asynchronous Transfer Mode (ATM) edge switches has emerged that are designed for service providers wishing to deploy IP (layer 3) services over narrowband and/or broadband services. These switches are designed to scale from DS0 to OC48c and support a multitude of services including frame relay, ATM, voice over ATM, Voice over IP (VoIP), wireless aggregation, Digital Subscriber Line (DSL) aggregation, ATM service backbones and Virtual Private Networks (VPN's). As the name implies, these routers reside at the edge of the network and provide a complete portfolio of differentiated services including IP (layer 3) services over ATM.

To support higher-level services, such as IP services over ATM, these edge switches typically incorporate functionality that allows the switch to quickly assemble ATM cells into ATM packets and process these packets at the layer 3 level. Often these switches incorporate special hardware that is targeted to processing incoming cells and performing packet reassembly in order to accelerate the process of packet assembly.

One aspect of ATM cell processing may involve translating a Virtual Path Identifier (VPI) and Virtual Channel Identifier (VCI) associated with the cell to an address that allows the cell to be reassembled into a packet. A content-addressable memory (CAM) is ideally suited to perform this translation because it can be programmed to map an address (e.g., a VPI/VCI combination) to an output value that in turn can be used to determine a translated address.

A CAM is a memory that is used to store binary data that is searchable on the basis of content. Typically, a CAM provides a "match mode" that permits all of data in the CAM to be searched to determine if a particular value is stored at one of the memory locations in the CAM. If the value is found, a "match" signal is typically asserted. In some CAM implementations, the address of the matching data is provided.

FIG. 1 illustrates a conventional address translation circuit comprising a CAM 120 connected to a random-access memory (RAM) 150. Both the CAM 120 and the RAM 150 are programmed by an external processor (not shown). The CAM 120 holds binary data that is representative of address values that are to be translated. The RAM holds the new (translated) address value.

Assume an address 110 is to be translated using the circuit illustrated in FIG. 1. Further assume the CAM has been programmed with an entry 130 that matches the address 110. The address 110 is supplied to the CAM 120. The CAM 120 searches its contents and locates the matching entry 130. The address of the matching entry 130 is used as an index (address) 140 to select a location in the RAM 150. The contents of the selected location contains the new address value 160. This new address value 160 is the value of the translated address.

As can be seen from this design, before address translation can be performed, both the CAM and the RAM need to be programmed, thus necessitating maintenance of two sets of data. Further, in a hardware implementation, logic needs to be provided to support both the CAM and RAM functions. In an environment where the number of gates available to implement a given design is limited, such as an ASIC, the amount of gates necessary to implement these functions may be impractical. It would be highly desirable to have a circuit that is capable of translating addresses with less programming and circuitry than the conventional address translation circuit.

SUMMARY OF THE INVENTION

The present invention comprises a technique for translating an address without incurring the overhead associated with conventional address translation circuits. The technique employed by the present invention performs address translation using only a CAM function and thereby obviating the use of additional functions such as a RAM. Advantageously, the invention reduces the amount of circuitry and configuring that is required to support an address translation function.

Specifically, a CAM is configured with a plurality of key values and their associated data values. Each key value represents an address to be translated, whereas the associated data value associated represents the translated address. Translation is effected by applying the address to the CAM and, if a matching key value is found, reading the output of the CAM. The output of the CAM is the translated address associated with the matching key value.

Advantageously, the present invention does not require additional functions, such as a RAM to perform address translation. Rather, the present invention simply requires a CAM function. Thus, the amount of circuitry and configuring involved to provide an address translation function using the present invention is less than conventional methods that use both a CAM and RAM to perform such translation.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
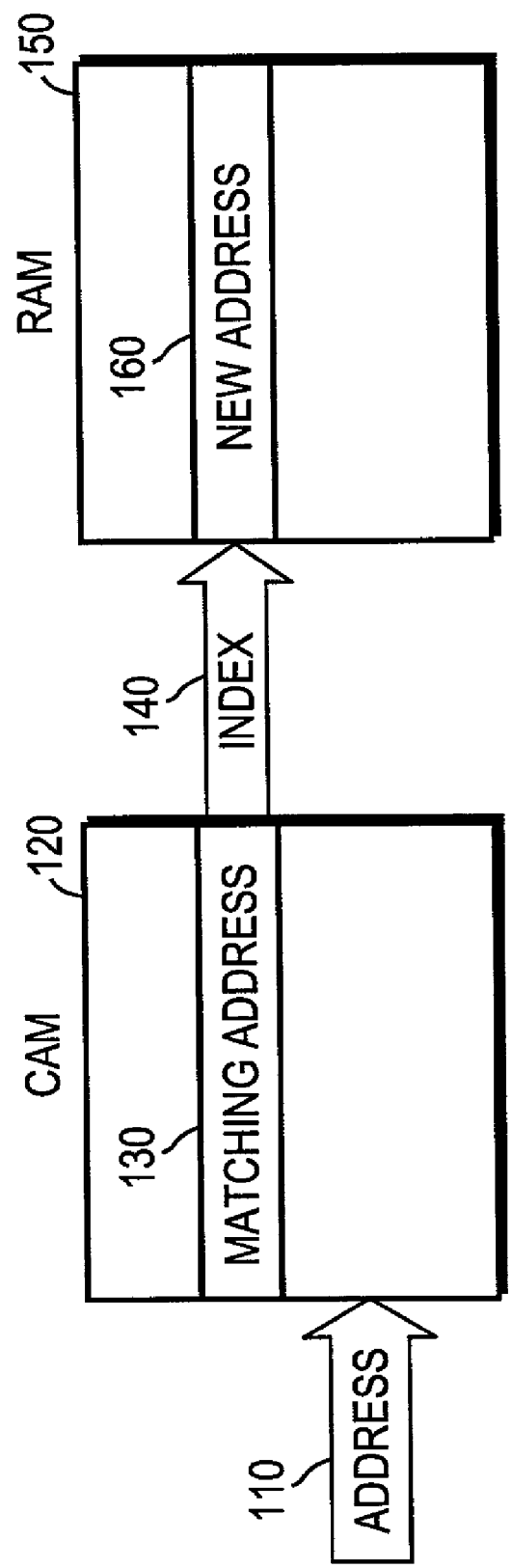
FIG. 1 is a block diagram of a conventional method for performing address translation using a CAM and RAM.
Figure 2:
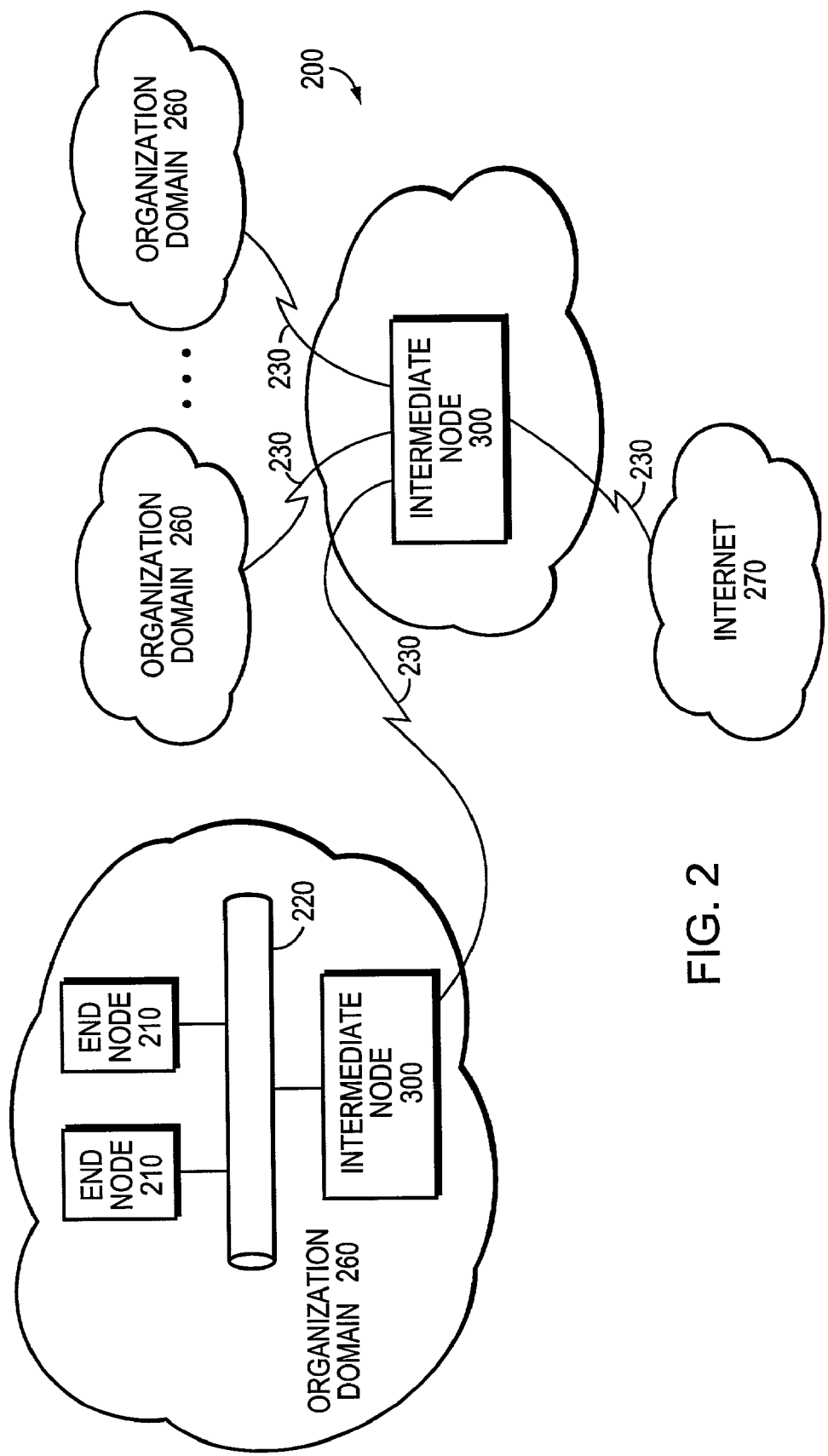
FIG. 2 is a schematic block diagram of a network including a collection of communication links and segments connected to a plurality of end and intermediate nodes.

FIG. 2 is a schematic block diagram of a computer network 200 comprising a collection of communication links and segments connected to a plurality of nodes, such as end nodes 210 and intermediate nodes 250. The network links and segments may comprise local area networks (LANs) 220 and wide area network (WAN) links 230 interconnected by intermediate nodes 250, such as network switches or routers, to form an internetwork of computer nodes. These internetworked nodes communicate by exchanging data packets according to a predefined set of protocols, such as the Transmission Control Protocol/Internet Protocol (TCP/IP) and the Asynchronous Transfer Mode (ATM) protocol.

Figure 3:
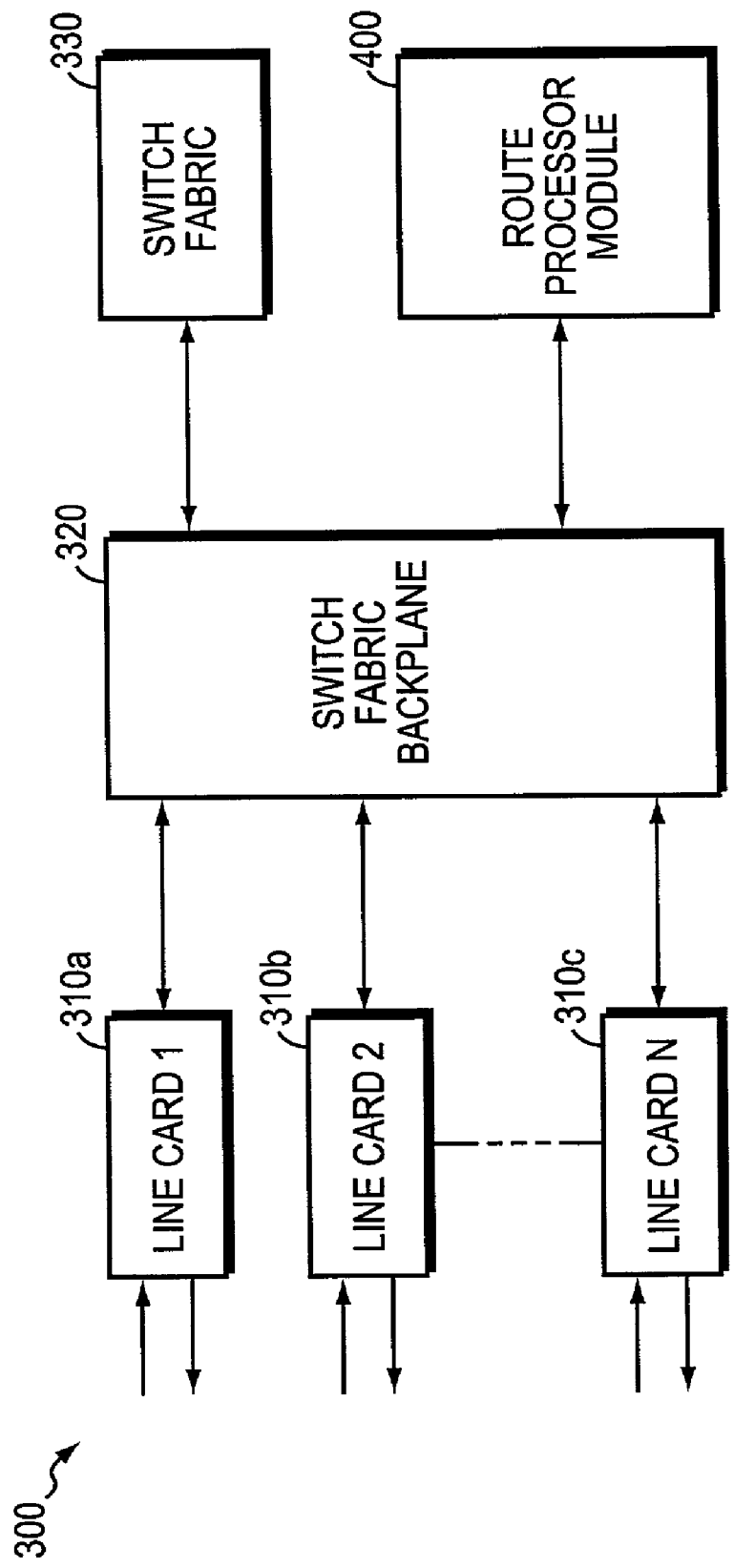
FIG. 3 is a partial block diagram of an intermediate node that can advantageously implement the present invention.

FIG. 3 is a partial block diagram of a typical intermediate node (switch) 300 that can be advantageously used to implement the present invention. An example of an intermediate node 300 that could be used in the computer network 200 is the Cisco MGX 8850 IP+ ATM Multiservice Switch, available from Cisco Systems, Incorporated, San Jose, Calif. The MGX 8850 is designed for service providers deploying narrowband and/or broadband services. The MGX 8850 scales from DS0 to OC48c and supports various services, such as frame relay, ATM, Voice over IP, circuit emulation, IP, wireless aggregation, DSL aggregation, ATM service backbones and Virtual Private Networks (VPN's).

The intermediate node 300 comprises a plurality of line cards 310, a switch fabric card 330 and a route processor module 400 interconnected by a switch fabric backplane 320. The line cards 310 connect (interface) the switch 300 with the network 200. To that end, the line cards 310 receive and transmit data over the network using various protocols, such as OC-48c, DS0, T3 and so on. The line cards 310 are also coupled to the switch fabric backplane 320 and forward data received from the network to the switch fabric backplane 320, as well as transmit data received from the switch fabric backplane 320 to the network.

The switch fabric backplane 320 comprises logic and a backplane that provides an interface between the line cards 310, the route processor 400 and the switch fabric card 330. For example, the switch fabric backplane 320 provides interconnections between the cards that allow data and signals to be transferred from one card to another.

The switch fabric card 330 comprises switch fabric logic (switch fabric) that is configured to switch data between ports located on the cards coupled to the switch fabric backplane 320. Data is sent from a given port to the switch fabric card 330. The switch fabric card 330 applies the data to the switch fabric logic and selects a destination port. The data is then switched to the destination port.

Figure 4:
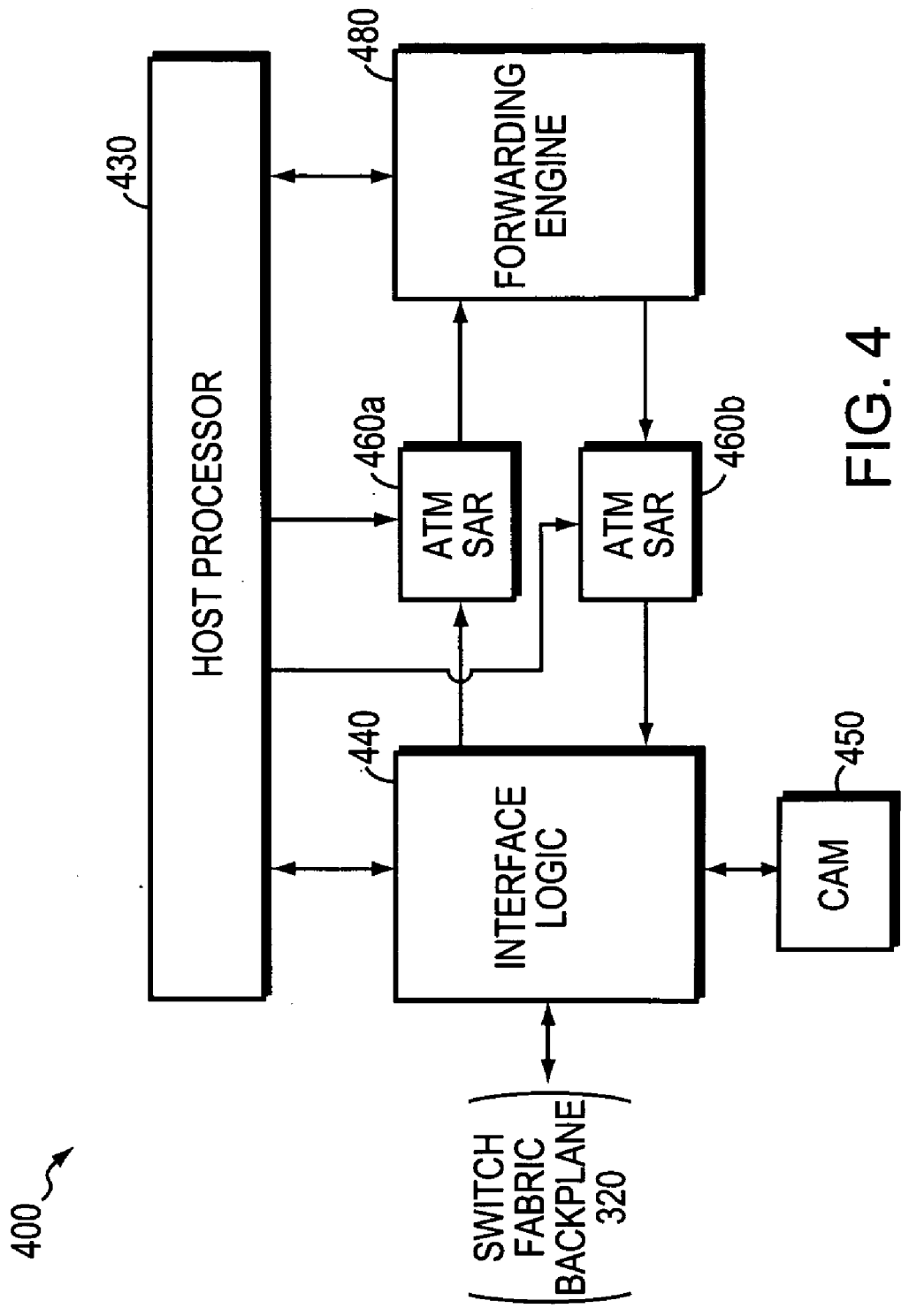
FIG. 4 is a block diagram of a route processor module that can advantageously implement the present invention.

The route processor module 400 is adapted to provide layer 3 processing for incoming packets. FIG. 4 is a block diagram of the route processor module 400 comprising a host processor 430, interface logic 440, a CAM 450, ATM "segmentation and reassembly" (SAR) logic 460 and a forwarding engine 480.

The host processor 430 comprises a general-purpose processor (not shown) such as, a MIPS route processor, coupled to a system controller (not shown) and a memory (not shown) such as, a synchronous dynamic random-access memory (SDRAM). The memory holds executable instructions that are executed by the general-purpose processor and enable (adapt) the processor to perform various functions. These functions include initializing various areas of the RP module 400 including constructing and loading the contents of the CAM 450.

The interface logic 440 comprises a Field Programmable Gate Array (FPGA) (not shown) that is, among other things, responsible for processing incoming and outgoing ATM cells and providing an interface between the switch fabric backplane 320, the CAM 450, the host processor 430 and the SAR 460.

The CAM 450 is responsible for performing address translation. The CAM 450 comprises logic that implements a content-addressable memory. In the illustrated embodiment, the CAM 450 holds data that is used to translate addresses contained in ATM cells processed by the FPGA logic. The CAM 450 is preferably embodied in a 8K entry by 64-bit word CAM device, such as the MUSIC MUAC8K64 available from Music Semiconductors, Hackettstown, N.J.

The ATM SAR 460 may be implemented as segmentation logic 460b and reassembly logic 460a. The segmentation logic 460b is responsible for segmenting a convergence sublayer protocol data unit (packet) into fixed length cells. The segmentation logic appends a header to each cell. This header includes the VPI and VCI associated with the cell. The reassembly logic 460a is responsible for reassembling cells into a packet (i.e., convergence sublayer protocol data unit). The reassembly logic 460a strips the cell header information from the individual cells and combines the remainder (payload) into a packet that can then be processed by the forwarding engine 480. In the preferred embodiment, the SAR 460 is implemented using standard commercially available parts, such as the Mindspeed CX 27470 available from Mindspeed Incorporated, San Diego, Calif.

The forwarding engine 480 is responsible for rendering forwarding decisions and, to that end, includes a processing engine (such as an arrayed processing engine) preferably embodied as two high-performance, application specific integrated circuits (ASICs) having a plurality of processors arranged as four (4) one dimensional (1-D) systolic array rows and eight (8) columns in a 4×8 arrayed configuration, wherein each column is coupled to a memory (not shown) called a column memory. The column memory preferably comprises synchronous dynamic random access memory (SDRAM) storage locations addressable by the processing engine for storing software code and data structures accessed by the processors. The software code is preferably a binary, assembly language image or microcode adapted for execution by processors of the forwarding engine 480. It will be apparent to those skilled in the art that other memory means, including various computer readable media, may be used for storing and executing program instructions pertaining to the operation of the forwarding engine.

Broadly stated, an ATM cell is received by a line card 310 where port and line card information is appended to the cell to produce an internal cell with a 40-bit header. The internal cell is transmitted over the switch fabric backplane 320 to the switch fabric card 330. The switch fabric card 330 determines an output destination port and switches the internal cell to the destination card associated with the port.

Internal cells destined for the route processor module are received and processed by the interface logic 440. The interface logic 440 strips the 40-bit header from the internal cell and applies it to the CAM 450 to translate the 40-bit header into a 24-bit header that can be used by the SAR logic 460. Assuming a matching entry is found, the interface logic 440 replaces the 40-bit header in the cell with the 24-bit header that is read from the output of the CAM 450. The cell is then passed to the reassembly logic 460a to be reassembled into a packet. The packet is then passed to the forwarding engine 480 for further processing.

Figure 5:
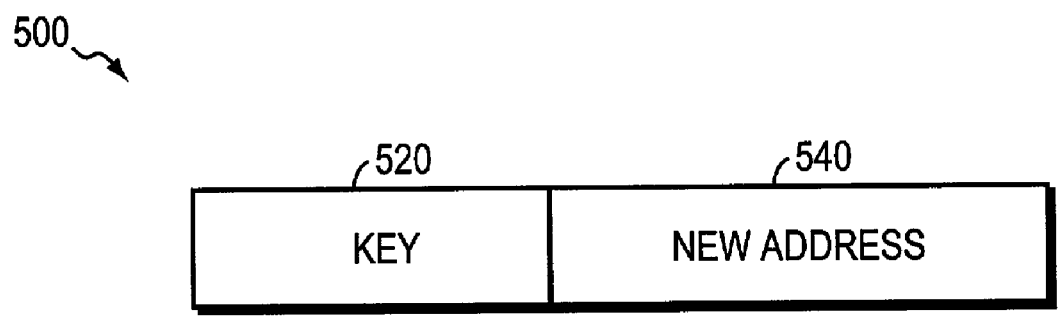
FIG. 5 is a block diagram illustrating the format of a CAM entry that can advantageously be used to implement the present invention.

In order to perform the address translation process, the CAM 450 is configured by the host processor 430 to translate a 40-bit address value into a 24-bit address value. FIG. 5 illustrates a data format 500 that preferably is used with the present invention to configure the entries of CAM 450.

The data format 500 of each entry comprises a key field 520 and a new address field 540. The key field 520 holds a value for comparison with the address applied to the CAM 450 to determine if a match exists. In the preferred embodiment, this field holds a 40-bit value that is representative of the 40-bit address value applied to the CAM 450. The new address field 540 holds the translated address that is outputted by the CAM 450 when a match is found. Preferably, this value is a 24-bit address value that can be used by the SAR 460 logic.

In summary, the novel technique employed by the present invention for translating an address using a CAM requires less logic than conventional address translation techniques. The CAM is configured with key values that are representative of the address values to be translated. Associated with these key values are data values that are representative of the translated address value. The address to be translated is applied to the CAM and if a matching key value is found, the data associated with the key value is output by the CAM.

It should be noted that the invention has been described in an embodiment that performs ATM cell header address translation. However, this is not a limitation of the invention. Rather, those skilled in the art will know how to use the invention to perform address translation for addresses in formats other than the ATM cell header format. For example, using the invention the CAM can be configured to translate addresses, such as IP addresses or Media Access Control (MAC) addresses.

In addition it should be noted that in the preferred embodiment, the CAM is configured where the key value is set to the address to be translated and the associated data value is set to the translated (new) address. However, this is not a limitation of the invention. Rather, in an alternate embodiment of the invention, the CAM could be configured such that the key value and/or its associated data value is set to a value that represents the output of a function, such as a hash function.

The illustrated embodiment of the present invention is described in a manner that would enable one skilled in the art to implement the present invention in hardware. However, this is also not a limitation of the invention. The described technique employed by the present invention can be implemented in whole or in part in computer readable and executable program instructions using techniques known to those skilled in the art of software development. For example, the operation of the CAM can be implemented as a software function, portions of which are typically resident in a computer memory and executed on a processor. It will be apparent to those skilled in the art that other memory means, including various computer readable media, may be used for storing and executing program instructions pertaining to the described mechanism and technique.

Advantageously, the inventive technique described herein enables an address to be translated using simply a CAM. The inventive technique only requires that the CAM be configured with a key value and an associated new address value. Once the CAM is configured according to the invention, an address can be translated simply by applying the address to the CAM and reading the CAM's output. The advantages provided by the described inventive technique includes a reduction in the amount of logic and programming necessary to perform address translation.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for utilizing a content addressable memory (CAM) having a plurality of entries for translating addresses associated with network messages, the method comprising:
   segregating the CAM such that each entry has two parts;
   loading the first part of each CAM entry with a first network address;
   loading the second part of each CAM entry with a second network address whereby, for each CAM entry, the second network address that is loaded into the second part is a translated address of the network address in the first part of the respective CAM entry;
   applying an input address only to the network addresses contained in the first part of the CAM;
   identifying a matching CAM entry; and
   utilizing the second network address from the second part of the identified matching CAM entry as the translated address for the input address.

2. The method of claim 1 wherein one or more of the first network addresses loaded into the first part of each CAM entry includes a Virtual Path Identifier (VPI), a Virtual Channel Identifier (VCI), an input port and an input line card.

3. The method of claim 2 wherein one or more of the second network addresses loaded into the second part of the CAM correspond to a VPI/VCI translation value.

4. The method of claim 3 wherein
   the input address is associated with an asynchronous transfer mode (ATM) cell, and
   the VPI/VCI translation value is utilized by a segmentation and reassembly (SAR) logic unit to reassemble the cell into a network packet.

5. The method of claim 3 wherein for every combination of Virtual Path Identifier (VPI), Virtual Channel Identifier (VCI), input port and input line card the corresponding VPI/VCI translation is unique.

6. The method of claim 1 whereby the translated address is obtained free from accessing a separate memory unit.

7. The method of claim 1 whereby the translated address is obtained in a single access to the CAM.

8. An intermediate node configured to translate an address, the intermediate node comprising:
   a switch backplane;
   a plurality of lines cards each coupled to the switch backplane, each line card configured and arranged to send and receive a plurality of messages across a computer network; and
   a route processor module coupled to the switch backplane, the route processor module having a content addressable memory (CAM), wherein
      the CAM has a plurality of entries, each of which has at least two parts,
      the first part of each CAM entry is preconfigured with a first address, and the second part is preconfigured with a second address that is a translated address for the first address, and
      the route processor module receives a given address from a selected line card, applies the given address only to the first part of each CAM entry, identifies a matching CAM entry, and utilizes the second address from the second part of the matching CAM entry as the translated address for the given address.

9. The intermediate node of claim 8 wherein
   the route processor module further includes an interface logic unit, one or more asynchronous transfer mode (ATM) segmentation and reassembly (SAR) logic units, and a forwarding engine, the interface logic unit is coupled to the CAM, and to the one or more ATM SAR logic units, the one or more ATM SAR logic units are coupled to the forwarding engine, in response to receiving an ATM cell having a given address, the interface logic derives a translated address for the given address by accessing the CAM, and provides the translated address to at least one of the one or more ATM SAR logic units;

the at least one ATM SAR logic unit associates the translated address with the ATM cell, reassembles the ATM cell into a packet and provides the packet to the forwarding engine, and the forwarding engine renders a forwarding decision to the packet.

10. The intermediate node of claim 9 wherein the route processor module further includes a host processor that configures the two parts of each CAM entry with respective first and second address values.

11. The intermediate node of claim 8 whereby the translated address is obtained free from accessing a separate memory unit.

12. An intermediate node configured to translate an address, the intermediate node comprising:

a content addressable memory (CAM) having a plurality of entries for translating addresses associated with network messages received at the intermediate node, whereby each CAM entry has two parts;

means for loading the first part of each CAM entry with a first network address, and the second part of each CAM entry with a second network address whereby, for each CAM entry, the second network address that is loaded into the second part is a translated address of the network address in the first part of the respective CAM entry;

means for comparing an input address only to the network addresses contained in the first part of the CAM to identify a matching CAM entry; and means for utilizing the second network address from the second part of the matching CAM entry as the translated address for the input address.

* * * * *